United States Patent [19]

Rhodes

[11] Patent Number: 5,318,822
[45] Date of Patent: Jun. 7, 1994

[54] HOLLOW CORE INSTRUMENT PANEL

[75] Inventor: Richard D. Rhodes, Somersworth, N.H.

[73] Assignee: Davidson Textron Inc., Dover, N.H.

[21] Appl. No.: 943,752

[22] Filed: Sep. 11, 1992

[51] Int. Cl.$^5$ .................................................. B60R 21/02
[52] U.S. Cl. .................................... 428/120; 180/90;
280/751; 280/752; 296/70; 428/35.7; 428/121;
428/122; 428/124; 428/126; 428/217; 428/218;
428/131
[58] Field of Search ............... 428/120, 121, 122, 124,
428/126, 119, 188, 218, 192, 217, 35.7, 131;
296/70; 280/751, 752; 180/90; D12/192

[56] References Cited

U.S. PATENT DOCUMENTS

| | | | |
|---|---|---|---|
| 3,042,137 | 7/1962 | Mathves et al. | 180/90 |
| 3,130,807 | 4/1964 | McHenry | 180/90 |
| 3,614,129 | 10/1971 | Sobkow | 280/150 |
| 4,317,582 | 3/1982 | Cottin et al. | 280/751 |
| 4,530,517 | 7/1985 | Miyabayashi et al. | 280/752 |
| 4,662,649 | 5/1987 | Ikeda et al. | 280/752 |
| 5,013,508 | 5/1991 | Troester | 264/224 |

FOREIGN PATENT DOCUMENTS 222345 11/1985 Japan ........................................ 296/70

*Primary Examiner*—Ellis P. Robinson
*Assistant Examiner*—Nasser Ahmad
*Attorney, Agent, or Firm*—Reising, Ethington, Barnard, Perry & Milton

[57] ABSTRACT

A hollow core instrument panel provides the look and feel of a urethane filled instrument panel without the associated disadvantages. A rigid retainer substrate provides a skeletal superstructure. A hollow shell applique is attached to the retainer substrate for providing a decorative exterior. The hollow shell applique includes a resilient upper wall, a lower wall, contoured to matingly engage the retainer substrate, a forward end wall and a rearward end wall. One or more ribs may be provided intermediate the forward and rearward end walls. The forward and rearward end walls are hook-shaped for mechanically clamping about the edges of the retainer substrate. Vent holes prevent pressure build-up within the hollow shell applique.

7 Claims, 2 Drawing Sheets

HOLLOW CORE INSTRUMENT PANEL

TECHNICAL FIELD

Background of the Invention

Automotive vehicles usually include an instrument panel structure located immediately in front of the front seat occupants of the vehicle for housing various switches, instruments and accessories. The instrument panel is typically formed with a resilient protective padtype covering about its outer surfaces to protect the occupants of the front seat from injury occurring during a frontal collision of the vehicle and to provide a pleasant and soft structure.

According to prior art techniques, the instrument panel includes a retainer substrate skeletal superstructure having a substantially rigid construction. The retainer substrate has at least one outer surface which is contoured with either a flat or curved surface configuration. This retainer substrate provides structural support for the instruments, switches and various accessories built into the instrument panel. To provide the resilient protective covering mentioned above, the prior art teaches the fabrication of a shell applique which is attached to the outer surface of the retainer substrate. This shell applique is formed by the skin-foam-insert method of construction which, as is well known in the art, is difficult to control and a major source of excess cost and scrap due the somewhat uncontrollable nature of the urethane foam process and tooling. Nevertheless, such prior art urethane filled instrument panels provide the proper aesthetic appearance and soft resilient feel necessary in vehicular instrument panels.

SUMMARY OF THE INVENTION AND ADVANTAGES

The subject invention contemplates a vehicular instrument panel assembly for providing the look and feel of a urethane filled instrument panel without the disadvantages associated therewith. The assembly comprises a retainer substrate having a substantially rigid construction and a contoured outer surface and a hollow shell applique disposed over the retainer substrate. The applique includes a resilient upper wall, a lower wall contoured to matingly engage the outer surface of the retainer substrate, a forward end wall interconnecting the lower wall and the resilient upper wall at a forward most location and being sufficiently rigid enough to support the resilient upper wall away from the lower wall to form an air gap therebetween, and a rearward end wall interconnecting the lower wall and the resilient upper wall at a rearward most location and being sufficiently rigid enough to support the resilient upper wall away from the lower wall to maintain the air gap. An attachment means is provided for attaching the lower wall to the outer surface of the retainer substrate so that the resilient upper wall is supported above the outer surface and above the lower wall whereby compressive forces applied to the resilient upper wall cause elastic deflection of the resilient upper wall into the air gap.

The invention also contemplates a method for forming a vehicular instrument panel assembly comprising the steps of forming a retainer substrate having a contoured outer surface, forming a lower wall having a contour matingly conforming to the outer surface of the retainer substrate, forming a resilient upper wall, forming a forward end wall between the lower wall and the resilient upper wall with sufficient rigidity to support the resilient upper wall away from the lower wall, forming a rearward end wall spaced from the forward end wall between the lower wall and the resilient upper wall with sufficient rigidity to support the resilient upper wall away from the lower wall, filling the interstitial space between the lower wall, the upper wall, the forward end wall, and the rearward end wall with air, and attaching the lower wall to the outer surface of the retainer substrate.

The method and assembly of the subject invention overcome the disadvantages associated with the fabrication and construction of the prior art urethane filled instrument panels by eliminating the high scrap rate and uncontrollability associated with the skin-foam insert construction process. To accomplish this the subject invention forms a hollow shell applique having a self supporting resilient upper surface which reacts with the look and feel of the prior art urethane filled instrument panels yet maintaining its characteristics solely by the choice of materials in which is it fabricated and the inclusion of an air gap therein.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
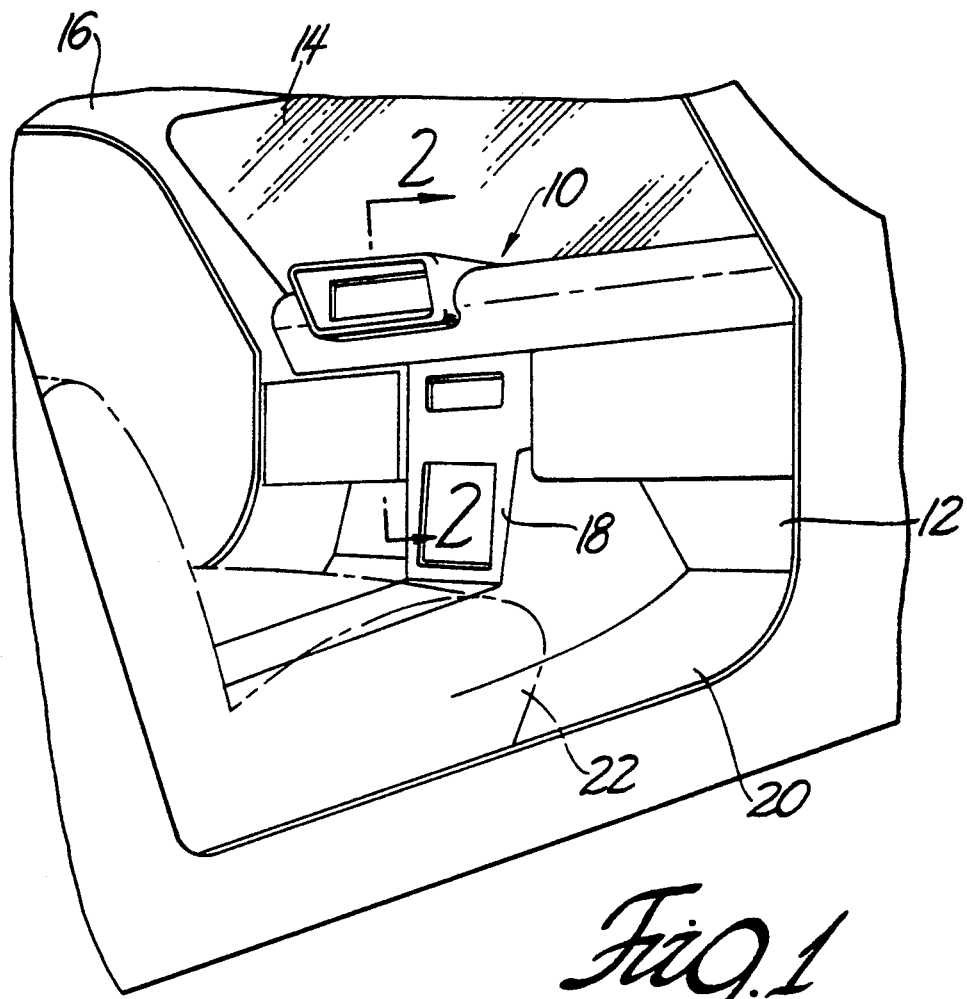
FIG. 1 is a fragmentary perspective view of the interior of an automobile including an instrument panel.

Referring to the Figures, wherein like numerals indicated like or corresponding parts throughout the several views, a vehicular instrument panel assembly is generally shown at 10 in FIG. 1. The instrument panel assembly 10 is of the type typically disposed on the inboard side of a front bulk head or fire wall 12. A windshield 14 extends upwardly from in front of the instrument panel assembly 10 and connects to a roof portion 16. A console portion 18 is shown extending downwardly from the instrument panel assembly 10 and resting upon a floor pan 20. A typical front occupant passenger seat is shown in phantom at 22.

Figure 2:
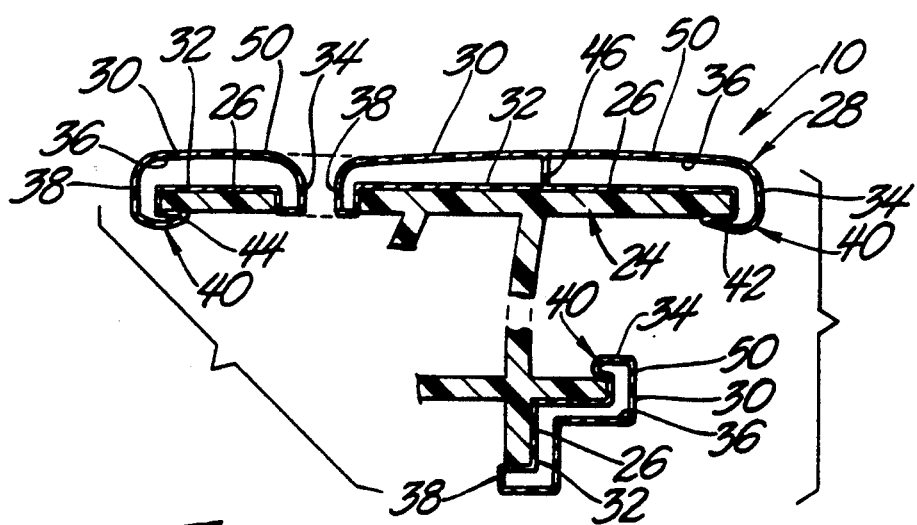
FIG. 2 is a simplified cross-sectional view of the instrument panel assembly taken substantially along lines 2—2 of FIG. 1.

In FIG. 2, the instrument panel assembly 10 is shown in simplified form including a retainer substrate, generally indicated at 24, having a substantially rigid construction and fabricated by injection molding of a suitable plastic material. While the rigid substrate, in a preferred embodiment is a injection molded plastic material, any equivalent rigid substrate is suitable for use therein. Typically, the thickness of the various retainer sections is between two and three millimeters. The retainer substrate 24 is provided with a contoured outer surface 26 which may be either flat, curved, or a combination of the two. The sectional view of FIG. 2 is taken through the instrument cluster of the instrument panel assembly 10, so that the configuration of the retainer substrate 24 illustrated is adapted to receive a cluster of instruments and the like, and also to provide venting ports as is typically associated with the windshield 14 defrost mechanism.

A hollow shell applique, generally indicated at 28, provides the look and feel of a prior art urethane filled instrument panel while avoiding the disadvantages associated therewith. More particularly, the applique 28 includes a resilient upper wall 30 and a lower wall 32 contoured to matingly engage the outer surface 26 of the retainer substrate 24. A forward end wall 34 interconnects the lower wall 32 and the resilient upper wall 30 at a forward most location of the panel assembly 10. The forward end wall 34 is constructed so as to be sufficiently rigid enough to support the resilient upper wall 30 away from the lower wall 32 to form an air gap 36 therebetween. Similarly, a rearward end wall 38 interconnects the resilient upper wall 30 and the lower wall 32 at a rearward most location. The rearward end wall 38 is also constructed so as to be sufficiently rigid enough to support the resilient upper wall 30 away from the lower wall 32 to maintain the air gap 36.

In this manner, the applique 28 resembles a bladder-like structure having a hollow core, or air gap 36, formed between the wall members 30, 32, 34, 38. The resiliency of the upper wall 30, combined with the resiliency of the forward 34 and rearward 38 end walls cooperate to form a structure which provides the look and feel of a urethane filled instrument according to the prior art. Preferably, the entire bladder applique 28 is formed integrally in one blow molding or rotational molding operation with polymeric compounds comprised of blended PVC (polyvinyl chloride) / ASA (acrylic-styrene-acrylonitrile) / ABS (acrylonitrile-butadiene-styrene), similar blended polymers or TPU (thermoplastic polyurethane or olefins blends of copolymers of polystyrene or styrene-acrylonitrile copolymer with butadiene-acrylonitrile rubber thermoplastic polymeric olefins. Hence, the entire applique 28 is resilient.

Figure 4:
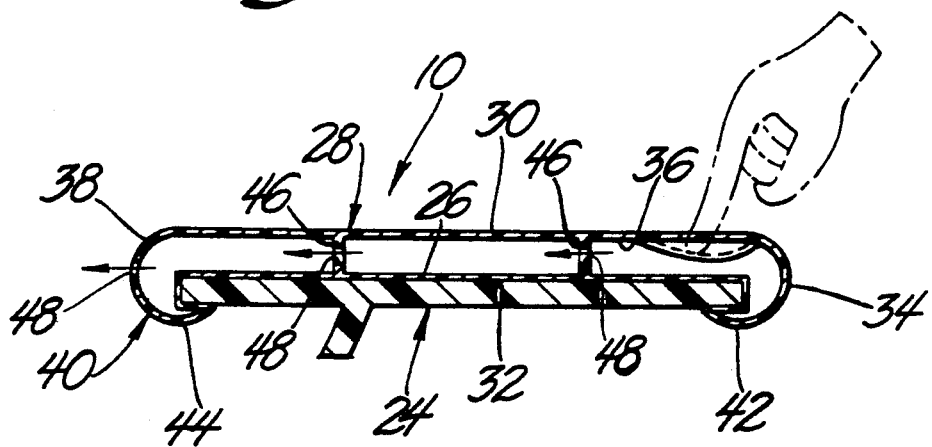
FIG. 4 is a cross-sectional view as in FIG. 3 showing the hollow shell applique fully attached over the outer surface of the retainer substrate.

An attachment means generally indicated at 40, is provided for attaching the lower wall 32 to the outer surface 26 so that the resilient upper wall 30 is supported above the outer surface 26 and above the lower wall 32 whereby compressive forces applied to the resilient upper wall 30 merely cause elastic deflection of the resilient upper wall 30 into the air gap 36. In FIG. 4, a human hand is illustrated in phantom applying such a compressive force to the resilient upper wall 30 with simple elastic deformation occurring in the resilient upper wall 30. Upon removal of the compressive force, the resilient upper wall 30 will spring back to its normal, free state, shape as shown in solid in FIG. 4.

Figure 3:
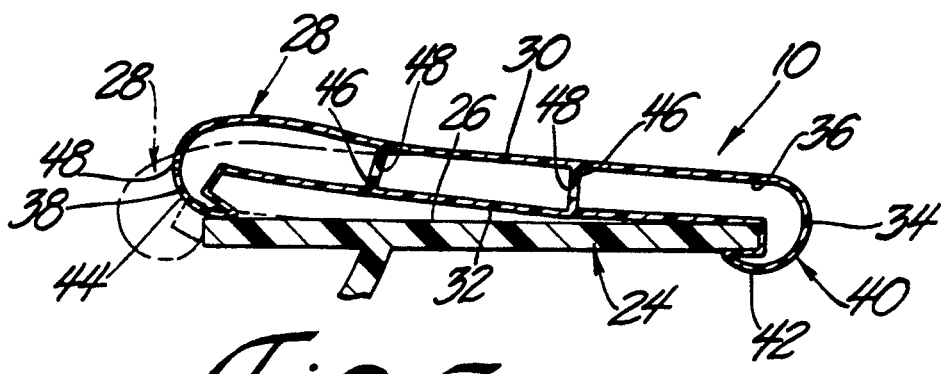
FIG. 3 is a cross-sectional view of a modified embodiment of the instrument panel assembly showing in solid the shell applique partially attached over the outer surface of the retainer substrate and in phantom moved toward the fully attached position.

Referring to FIGS. 2–4, the attachment means 40 may comprise uncinate, or hook-shaped, formations 42, 44 integrally molded into the respective forward end wall 34 and rearward end wall 38 adjacent their connections to the lower wall 32. In this manner, the applique 28 may be simply clamped to the retainer substrate 24 and remain in place under its own resilient gripping action. Alternatively, other methods may be used to attach the lower wall 32 to the outer surface 26 of the retainer substrate 24, such as gluing, sonic welding, hook and loop fasteners, or mechanical fastening devices such as screws, snaps, or rivets. The hook and loop, or Velcro TM, style fastener may include either one of the hook strip or loop strip being attached during formation of the retainer substrate 24 by injection molding. In yet another manner of effecting attachment between the lower wall 32 and the outer surface 26 of the retainer substrate 24, a coinjection molding technique may be employed provided the materials are compatible and the geometries of the respective retainer substrate 24 and applique 28 are acceptable. In a coinjection molding technique, the retainer substrate 24 and applique 28 would be formed in one mold using well known coinjection molding techniques.

It is imperative that the modulus of elasticity of the resilient upper wall 30 and the forward 34 and rearward 38 end walls be such that the resulting feel and compression loading of the applique 28 matches the prior art urethane filled instrument panel constructions. As mentioned above, this is achieved in part by a proper blending of polymer materials, and also by controlling the thickness of the resilient upper wall 30 and forward 34 and rearward 38 end walls. An additional method of controlling the feel of the applique 28 is to form one or more ribs 46 intermediate the forward 34 and rearward 38 end walls and interconnecting the lower wall 32 and resilient upper wall 30. The ribs 46, like the end walls 34, 38 must be sufficiently rigid enough to maintain the desired air gap 36. By strategically positioning and designing the ribs 46, the contour of the resilient upper wall 30 can be adjusted or altered with respect to the contour of the outer surface 26 of the retainer substrate 24.

Yet another method of controlling the resulting feel and compression loading of the applique 28 is to provide a small manual pump (not shown) as commonly used on pneumatic tennis shoes to either increase or decrease the atmospheric pressure within the air gap 36.

It is possible that increased temperature may cause unacceptable expansion of the air within the air gap 36. If this is a concern, one or more vent holes 48 may be provided to maintain a constant ambient internal pressure within the air gap 36. As shown in FIGS. 3 and 4, when several ribs 46 are used to divide the air gap 36 into individual compartments, vent holes 48 may be located through each of the ribs 46 as well as an undetectable vent hole 48 extending through the rearward end wall 38 to prevent pressure buildup during high heat conditions. For illustrative purposes only, small arrows indicate the migration of air in the air gap 36 when pressure is applied by a human hand in FIG. 4. Of course, the vent hole 48 must take the form of a pressure relief valve (not shown), or the like, in the event a manual pump is used as described above.

An exterior surface 50 is formed about the visible portion of the resilient upper wall 30, as well as the forward and rearward end walls 34, 38, and comprises that portion of the applique 28 which is visible and accessible to occupants of the vehicle. Most preferably, the exterior surface 50 is imparted with a simulated grain pattern to more closely conform the subject instrument panel assembly 10 to the prior art urethane filled instrument panels.

The instrument panel assembly 10 is fabricated by first forming the retainer substrate 24 and its contoured outer surface 26. This may be done using a conventional injection molding technique. Further steps in the fabrication process include forming the lower wall 32 of the applique 28 with a contour matingly forming to the outer surface 26 of the retainer substrate 24, then forming the resilient upper wall 30, next forming the forward end wall 34 between the lower wall 32 and resilient upper wall 30 with sufficient rigidity to support the resilient upper wall 30 away from the lower wall 32, then forming the rearward end wall 38 spaced from the forward end wall 34 between the lower wall 32 and the resilient upper wall 30 with sufficient rigidity to support the resilient upper wall 30 away from the lower wall 32, next filling the interstitial space, or air gap 36, between the lower wall 32, the upper wall 30, the forward end wall 34, and the rearward end wall 38 with air, and finally attaching the lower wall 32 to the outer surface 26 of the retainer substrate 24. The process of forming the applique 28 may be carried out by either the conventional rotational molding or blow molding type techniques. Further, the forming process also includes imparting a simulated grain pattern on the exterior surface 50 of the resilient upper wall 30.

The instrument panel assembly 10 thus formed significantly overcomes the disadvantages of the prior art urethane foamed instrument panels by substantially reducing the scrap costs, the labor and material costs associated with scrapping large amounts of material, and providing a fit, finish, functionality and appearance acceptably comparable to the prior art urethane filled instrument panel assemblies.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numbers are merely for convenience and are not to be in any way limiting, the invention may be practiced otherwise than as specifically described.

What is claimed is:

1. A vehicular instrument panel assembly for providing the look and feel of a urethane filled instrument panel without the disadvantages associated therewith, said assembly comprising:
   a plastic retainer substrate having a substantially rigid construction and a contoured outer surface;
   a polymeric hollow shell applique including a resilient upper wall, a lower wall contoured to matingly engage said outer surface of said retainer substrate, a forward end wall integrally joined by rotational molding or blow molding to said resilient upper wall and said lower wall for interconnecting said lower wall and said resilient upper wall at a forward most location and being sufficiently rigid enough to support said resilient upper wall away from said lower wall to form an air gap therebetween, and a rearward end wall integrally joined by rotational molding or blow molding to said resilient upper wall and said lower wall for interconnecting said lower wall and said resilient upper wall at a rearward most location and being sufficiently rigid enough to support said resilient upper wall away from said lower wall to maintain said air gap; and
   at least one uncinate formation formed integrally of each of said forward end wall and said rearward end wall for attaching said hollow shell applique to said retainer substrate whereby said hollow shell bladder applique can be connected as a unit to said retainer substrate at said outer surface so that said resilient upper wall is supported above said outer surface and said lower wall whereby compressive forces applied to said resilient upper wall cause elastic deformation of said resilient upper wall into said air gap.

2. A vehicular instrument panel assembly for providing the look and feel of a urethane filled instrument panel without the disadvantages associated therewith, said assembly comprising:
   a plastic retainer substrate having a substantially rigid construction and a contoured outer surface;
   a polymeric hollow shell applique including a resilient upper wall, a lower wall contoured to matingly engage said outer surface of said retainer substrate, a forward end wall integrally joined by rotational molding or by blow molding to said resilient upper wall and to said lower wall for interconnecting said lower wall and said resilient upper wall at a forward most location and being sufficiently rigid enough to support said resilient upper wall away from said lower wall to form an air gap therebetween, and a rearward end wall integrally joined by rotational molding or by blow molding to said resilient upper wall and to said lower wall for interconnecting said lower wall and said resilient upper wall at a rearward most location and being sufficiently rigid enough to support said resilient upper wall away from said lower wall to maintain said air gap;
   an attachment integrally joined by rotational molding or by blow molding with said forward end wall and said rearward end wall for attaching said hollow shell applique as a unit to said retainer substrate at said outer surface so that said resilient upper wall is supported above said outer surface and said lower wall whereby compressive forces applied to said resilient upper wall cause elastic deformation of said resilient upper wall into said air gap; and
   a rib disposed between said forward end wall and said rearward end wall and integrally joined to said lower wall and said resilient upper wall for maintaining the air gap.

3. An assembly as set forth in claim 2, further including a vent hole disposed through said rib.

4. An assembly as set forth in claim 1, further including a rib disposed between said forward end wall and said rearward end wall and integrally joined to said lower wall and said resilient upper wall for maintaining the air gap.

5. An assembly as set forth in claim 2, wherein said attachment applies a spaced apart clamping force on said retainer substrate in accordance with the resilience of said upper wall.

6. An assembly as set forth in claim 2, wherein said attachment is molded with said retainer substrate.

7. An assembly as set forth in claim 4, further including a vent hole disposed through said rib.

* * * * *